US008091112B1

(12) United States Patent
Elliott et al.

(10) Patent No.: US 8,091,112 B1
(45) Date of Patent: Jan. 3, 2012

(54) SYSTEM AND A METHOD FOR TRANSMITTING AND RECEIVING A PROGRAM WITH IMPROVED EFFICIENCY (75) Inventors: Timothy J. Elliott, Fountain Valley, CA (US); William P. Price, Fountain Valley, CA (US)

(73) Assignees: Keen Personal Technologies, Inc., Irvine, CA (US); Keen Personal Media, Inc., Irvine, CA (US)

( * ) Notice: Subject to any disclaimer, the term of this patent is extended or adjusted under 35 U.S.C. 154(b) by 2153 days.

(21) Appl. No.: 09/796,921

(22) Filed: Feb. 28, 2001

(51) Int. Cl.
H04N 7/16 (2006.01)
H04N 7/173 (2006.01)

(52) U.S. Cl. ............ 725/135; 725/87; 725/90; 725/95; 725/96

(58) Field of Classification Search .............. 725/67, 725/68, 71, 135, 87–104, 115–116, 145–146
See application file for complete search history.

(56) References Cited

U.S. PATENT DOCUMENTS

| | | | | | |
|---|---|---|---|---|---|
| 5,132,992 | A | * | 7/1992 | Yurt et al. | 375/240 |
| 5,541,919 | A | * | 7/1996 | Yong et al. | 370/416 |
| 5,600,378 | A | * | 2/1997 | Wasilewski | 348/468 |
| 5,612,742 | A | * | 3/1997 | Krause et al. | 375/240.25 |
| 5,619,337 | A | * | 4/1997 | Naimpally | 386/83 |
| 5,687,297 | A | * | 11/1997 | Coonan et al. | 358/1.2 |
| 5,721,823 | A | * | 2/1998 | Chen et al. | 709/203 |
| 5,737,009 | A | * | 4/1998 | Payton | 725/93 |
| 5,751,336 | A | * | 5/1998 | Aggarwal et al. | 725/146 |
| 5,754,784 | A | * | 5/1998 | Garland et al. | 709/219 |
| 5,826,168 | A | * | 10/1998 | Inoue et al. | 725/101 |
| 5,838,678 | A | * | 11/1998 | Davis et al. | 370/389 |
| 5,856,973 | A | * | 1/1999 | Thompson | 370/389 |
| 5,862,140 | A | * | 1/1999 | Shen et al. | 370/468 |
| 5,886,731 | A | * | 3/1999 | Ebisawa | 725/32 |
| 5,926,205 | A | * | 7/1999 | Krause et al. | 725/103 |
| 5,936,659 | A | * | 8/1999 | Viswanathan et al. | 725/103 |
| 5,956,341 | A | * | 9/1999 | Galand et al. | 370/412 |
| 5,966,120 | A | * | 10/1999 | Arazi et al. | 715/724 |
| 5,966,385 | A | * | 10/1999 | Fujii et al. | 370/465 |
| 6,018,359 | A | * | 1/2000 | Kermode et al. | 725/101 |
| 6,037,983 | A | * | 3/2000 | Au et al. | 348/399.1 |
| 6,157,948 | A | * | 12/2000 | Inoue et al. | 709/219 |
| 6,157,949 | A | * | 12/2000 | Cheng et al. | 725/101 |
| 6,208,804 | B1 | * | 3/2001 | Ottesen et al. | 386/125 |
| 6,215,530 | B1 | * | 4/2001 | Wasilewski | 348/731 |
| 6,233,253 | B1 | * | 5/2001 | Settle et al. | 370/474 |
| 6,438,596 | B1 | * | 8/2002 | Ueno et al. | 709/226 |
| 6,480,537 | B1 | * | 11/2002 | Agrawal et al. | 375/240 |
| 6,502,139 | B1 | * | 12/2002 | Birk et al. | 709/233 |
| 6,526,051 | B1 | * | 2/2003 | Kandler | 370/389 |
| 6,588,014 | B1 | * | 7/2003 | Hayashi | 725/54 |
| 6,594,271 | B1 | * | 7/2003 | Wu et al. | 370/412 |
| 6,614,843 | B1 | * | 9/2003 | Gordon et al. | 375/240.01 |
| 6,622,305 | B1 | * | 9/2003 | Willard | 725/101 |
| 6,651,252 | B1 | * | 11/2003 | Gordon et al. | 725/54 |
| 6,701,528 | B1 | * | 3/2004 | Arsenault et al. | 725/89 |

(Continued)

Primary Examiner — Son P Huynh (57) ABSTRACT

A method of transmitting programs from a source of programs to a user location divides a program into a plurality of program streams, wherein each program stream represents a temporal segment of the program. The method adds identification data to the plurality of program streams and multiplexes the plurality of program streams comprising the identification data into a transport stream. The transport stream is transmitted to a user location. The program represented by the plurality of program streams is transmitted in a reduced amount of time. The amount of time decreases with the number of program streams used.

29 Claims, 4 Drawing Sheets

U.S. PATENT DOCUMENTS

| | | | |
|---|---|---|---|
| 6,772,217 B1 * | 8/2004 | Baumann et al. | 709/232 |
| 6,823,394 B2 * | 11/2004 | Waldvogel et al. | 709/231 |
| 6,831,892 B2 * | 12/2004 | Robinett et al. | 370/232 |
| 6,986,156 B1 * | 1/2006 | Rodriguez et al. | 725/95 |
| 7,024,679 B1 * | 4/2006 | Sie et al. | 725/101 |
| 7,143,431 B1 * | 11/2006 | Eager et al. | 725/101 |
| 7,155,735 B1 * | 12/2006 | Ngo et al. | 725/101 |
| 2001/0036271 A1 * | 11/2001 | Javed | 380/217 |
| 2002/0023270 A1 * | 2/2002 | Thomas et al. | 725/95 |
| 2002/0157103 A1 * | 10/2002 | Song et al. | 725/97 |
| 2005/0229213 A1 * | 10/2005 | Ellis et al. | 725/58 |

* cited by examiner

SYSTEM AND A METHOD FOR TRANSMITTING AND RECEIVING A PROGRAM WITH IMPROVED EFFICIENCY

BACKGROUND OF THE INVENTION

1. Field of the Invention

The invention relates to a system for presenting a program to a user. More particularly, the invention relates to a method, system and apparatus for efficiently transmitting and receiving a program for presentation to a user.

2. Description of the Related Art

A conventional system for displaying a program, e.g., a video program, includes a monitor or a television (TV) set connected to a set top box. The set top box is connected through a coaxial cable to a cable TV network or a satellite dish for "satellite TV." The TV set and the set top box are located, for example, in a user's home and receive a multitude of TV channels from a broadcast head end, wherein each TV channel has a multitude of programs during a typical day. In order to select and watch a certain program, the user controls, for example, the set top box to tune to a desired channel. The TV set receives a video signal from the set top box and displays the program of the desired channel.

A user may expand the system by connecting a video recorder to the TV set and the set top box to personalize television viewing by recording a program and watching it when it is convenient for the user. Further, the user may subscribe to and receive premium content such as subscription channels, pay-per-view services or video-on-demand services in order to watch a movie on a certain day and at a time of day for which the user has to pay a per-movie fee. The user may further personalize television viewing by subscribing to services such as ReplayTV (offered by Replay Network) and TiVo (offered by Philips). For instance, the video recorder may be a digital video recorder that includes a hard disk drive with a storage capacity of between 10 GB and 30 GB for recording of up to 30 hours of television programming.

In order to accommodate personalized television, the systems transmit, process and store large quantities of program data. For instance, in a conventional system, an encoder is used to compress and to encode the program data, and a decoder is used to decompress and to decode the program data. The encoder outputs a stream of program data that has a reduced bit rate and a reduced redundancy. The encoder and decoder usually operate in accordance with international standards, e.g., a compression process defined by the Moving Picture Expert Group (MPEG), e.g., MPEG-2, or by the International Telecommunications Union (ITU), e.g., the H.263 standard, that define uniform requirements for coding and decoding of program data.

For instance, the MPEG-2 compression of a program by an MPEG-2 encoder at the broadcast head end results in a single compressed program, which is referred to as "single-program elementary stream." The MPEG-2 encoder packetizes the single-program elementary stream to generate a packetized elementary stream (PES). An MPEG-2 program multiplexer multiplexes a group of packetized elementary stream into a "transport stream." The transport stream includes multiple series of fixed-size data packets. Each data packet comprises a payload and a header that includes packet identification ("PID") values.

The broadcast head end transmits the transport stream at a constant data rate regardless of the number of single-program streams contained within it. That is, if the transport stream contains six single-program streams or only one single-program stream, the broadcast head end transmits the transport stream at the same rate. For example, if the transport stream contains six programs, each of which is an hour in length, the broadcast head end transmits all six programs over a one-hour period of time. Likewise, if the transport stream contains only one (one-hour) program, the broadcast head end still transmits the transport stream over the one-hour period of time. Therefore, the efficiency of the transport stream drops as the number of program streams contained in the transport stream decreases. Thus, there is a need for an improved technique for transmitting a program with improved efficiency.

SUMMARY OF THE INVENTION

The present invention may be regarded as method of transmitting programs from a source of programs to a user location. The method divides a program into a plurality of program streams, wherein each program stream represents a temporal segment of the program, and adds identification data to the plurality of program streams. The method multiplexes the plurality of program streams including the identification data into a transport stream and transmits the transport stream to a user location.

The present invention may also be regarded as a system for transmitting a program. A segmentizer divides a program into a plurality of program streams, wherein each program stream represents a temporal segment of the program. The segmentizer further adds identification data to the plurality of program streams. A multiplexer multiplexes the plurality of program streams including the identification data into a transport stream, and a transmitter transmits the transport stream to a user location.

The present invention may further be regarded as a method of reconstructing a program. The method receives a transport stream including a plurality of program streams defining a program, wherein each program stream represents a temporal segment of the program, and wherein the plurality of program streams includes identification data. The method processes the transport stream for reassembly of the program in accordance with the identification data.

The present invention may additionally be regarded as a system for reconstructing a program at a user location. A receiver is configured to receive a transport stream including a plurality of program streams defining a program, wherein each program stream represents a temporal segment of the program, and wherein the plurality of program streams includes identification data. A storage management system is coupled to the receiver and is configured to process the transport stream to provide for reassembly of the program in accordance with the identification data. A storage device is coupled to the storage management system and is configured to store at least the plurality of program streams. A decoder is coupled to the storage management system and is configured to process the plurality of program stream for presenting the program to the user.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENT

Figure 1:
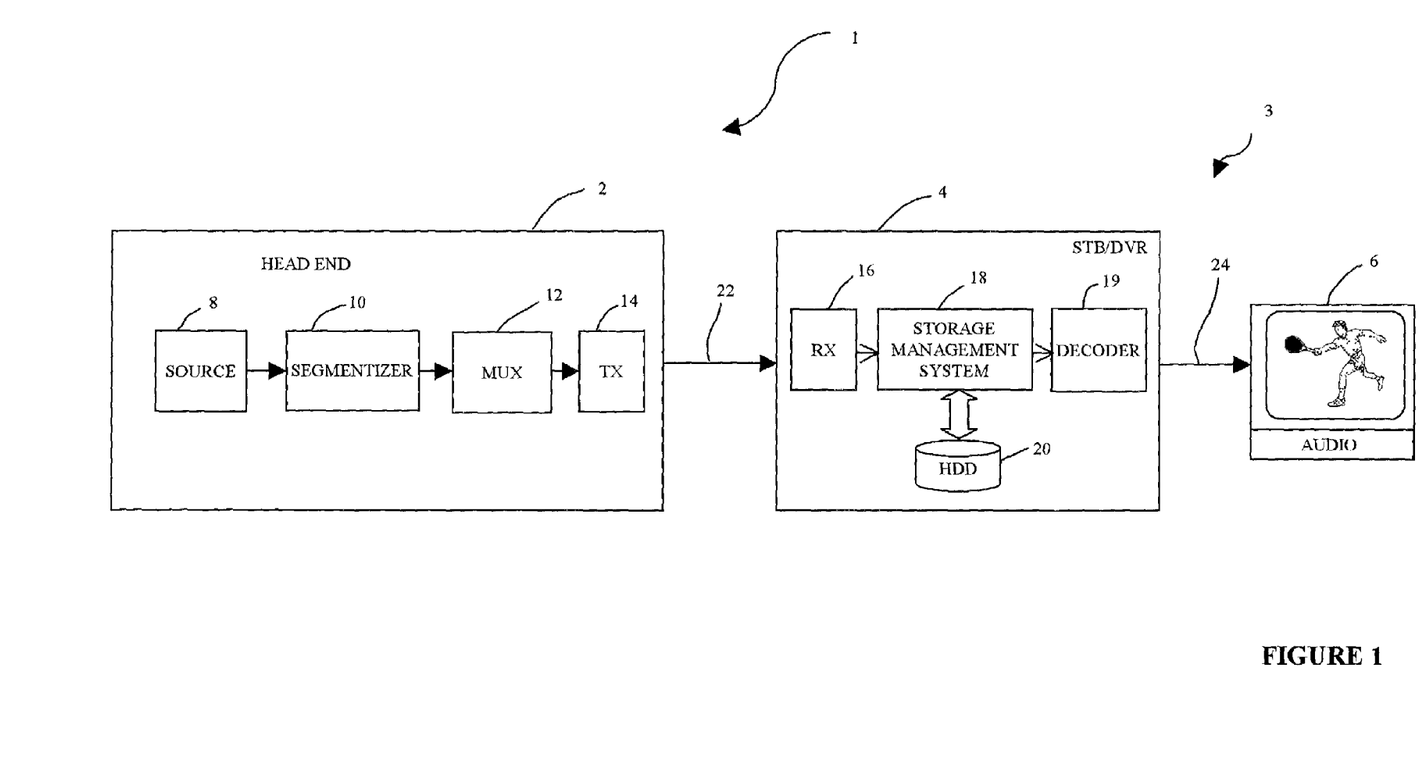
FIG. 1 shows a system for transmitting and receiving a program in accordance with an embodiment of the present invention that includes a head end coupled to an audio/video apparatus, wherein the head end includes a segmentizer and a multiplexer that generates a transport stream including a plurality of program streams of a program and associated identification data, wherein a receiver receives the transport stream, and wherein a storage management system provides for storing and retrieving of the transport stream so that the program may be presented to a user.

FIG. 1 illustrates an embodiment of a system 1 for transmitting and receiving a program in accordance with an embodiment of the present invention, which is configured to operate in accordance with the method of the present invention. The system 1 includes a head end 2 and an audio/video ("A/V") apparatus 3 coupled to the head end 2 via a network 22. The A/V apparatus 3 includes an A/V receiver 4 and an audio/display device 6 coupled to the A/V receiver 4 via a connection 24. The head end 2 includes a source 8 for a program (e.g., a video program, an audio program, text, images, or data content), a segmentizer 10, a multiplexer 12 (MUX) and a transmitter 14 (TX) to generate and to send a transport stream to the A/V apparatus 3. The A/V receiver 4 includes a receiver 16 (RX), a storage management system 18, a storage device 20 (HDD) and a decoder 19. In one embodiment, the A/V receiver 4 may be implemented within a set top box (STB), a digital (personal) video recorder (DVR), or a combination of a set top box and a digital video recorder. Further structural details of the system 1, which provides for efficient transmission of a program in a reduced amount of time, are described following a functional description of the system 1 set forth hereinafter.

Figure 2:
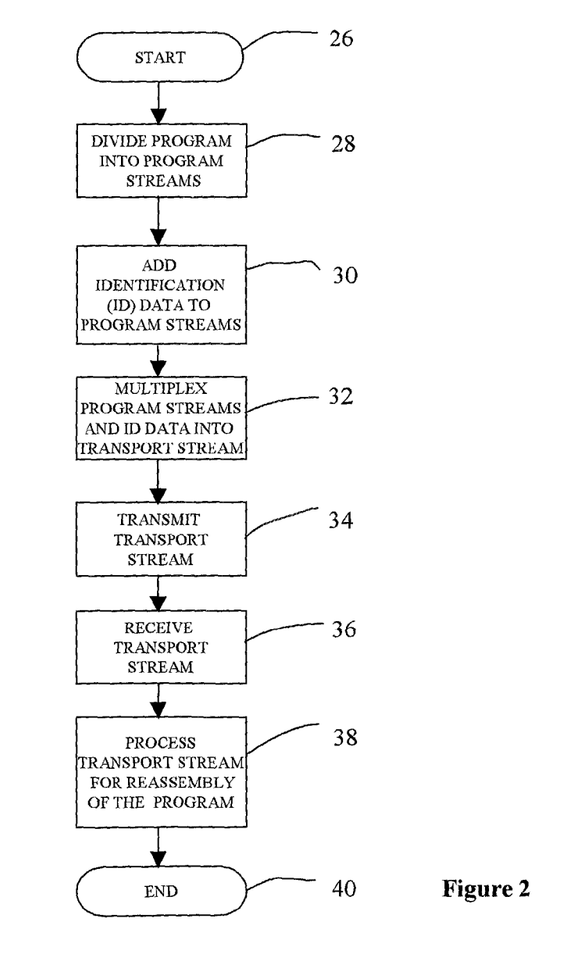
FIG. 2 is a flowchart of a procedure illustrating the method in accordance with an embodiment of the present invention that divides a program into a plurality of program streams, adds identification data to the plurality of program streams, and multiplexes the program streams with the identification data into a transport stream that is transmitted to an audio/video apparatus for presentation to a user.

FIG. 2 is a flowchart of a procedure illustrating the method in accordance with the present invention that transmits a program to a user. In one embodiment, the procedure utilizes a program that is encoded and compressed in accordance with the MPEG-2 standard. However, it is contemplated that the invention is generally applicable in connection with other MPEG standards (e.g., MPEG-4) and with systems in which the head end 2 sends the program as a digital signal compressed or encoded in accordance with other compression/encoding techniques.

In a step 26, e.g., when the head end 2 processes a scheduled or a requested transmission of a program (e.g., a particular video program or audio program), the procedure initializes the system 1. The initialization procedure includes, among others, determining the number of programs that are scheduled or requested and obtaining from the source 8 the particularities of each program, such as the length of a video program.

In a step 28, the procedure divides a program into a plurality of program streams. Each program stream represents a temporal segment of the program. For example, if the program has a duration of 120 minutes, the procedure may divide the program into three program streams, wherein each program stream represents a temporal segment of forty minutes of the program. In one embodiment, the source 8 for video content provides the program as an MPEG-2 compressed single-program elementary stream. The single-program elementary stream is then packetized in a sequence of packets, wherein each packet is identified by a PID value. In one embodiment, the plurality of program streams is a plurality of packetized elementary streams.

In a step 30, the procedure adds identification ("ID") data to the program streams. In accordance with the present invention, the ID data includes information that describes the plurality of program streams generated in the step 28. That is, the ID data identifies sequential temporal segments through incremental data. For example, the temporal segment that represents the first forty minutes of the program is identified, for example, as "101," the temporal segment that represents the second forty minutes is identified as "102," and so forth. The ID data permits reconstruction of the proper sequence of the temporal segments and, thus, proper reconstruction of the program at the A/V apparatus 3.

The plurality of program streams is further described by tables defined in the MPEG-2 standard, such as a Program Association Table ("PAT"), a Program Map Table ("PMT") and a Conditional Access Table (CAT). The PAT lists the programs in the transport stream and provides the PID value where the PMT for each program can be found. The PMT for each program lists all video streams, audio streams and data streams for a program and provides their PID values. The PMT and PAT comprise information so that each program stream of the plurality of program streams is identified as representing a temporal segment of the same program. The CAT provides the PID values for conditional access information to be used by conditional access modules of the system 1. The ID data is further described below with reference to FIG. 3.

In a step 32, the procedure multiplexes the plurality of program streams with the ID data into a transport stream. In one embodiment, the procedure uses time multiplexing and a program multiplexer as known in the art.

In a step 34, the procedure transmits the transport stream over the network 22. In accordance with the present invention, the procedure transmits the program in a reduced amount of time so that the system 1 operates more efficiently when transmitting only a few programs. The amount of time decreases with the number of program streams used. That is, in the above example where the two-hour program is divided into three forty-minute segments, the two-hour program is transmitted in only forty minutes instead of 120 minutes.

In a step 36, the procedure receives the transport stream at a user location.

In a step 38, the procedure processes the transport stream for reassembly of a selected program at the user location. For example, the procedure may extract the plurality of program streams from the transport stream to provide for further processing and reassembly of the program in accordance with the ID data. As each program stream includes the ID data, the PMT and the PAT, the program can be reassembled in the original sequence and presented to the user. Further, in one embodiment, the ID data includes the CAT for at least one program so that the user can subscribe to and receive conditional access programs.

In one embodiment, the further processing includes storing the temporal segments. The temporal segments may be stored at separate storage locations until the user wants to watch the program. Alternatively, if the user wants to watch the program as a "live" program, the procedure may process and display the first temporal segment, e.g., the first forty minutes, while the subsequent temporal segments are stored. The procedure processes and displays the subsequent temporal segments in accordance with incremental identification data of the ID data.

It is contemplated that in another embodiment, the procedure may store the transport stream before extracting the plurality of program streams from the transport stream. The procedure may then extract the plurality of program streams and reassemble the program when the user wants to watch the program. The procedure ends in a step 40.

Figure 3:
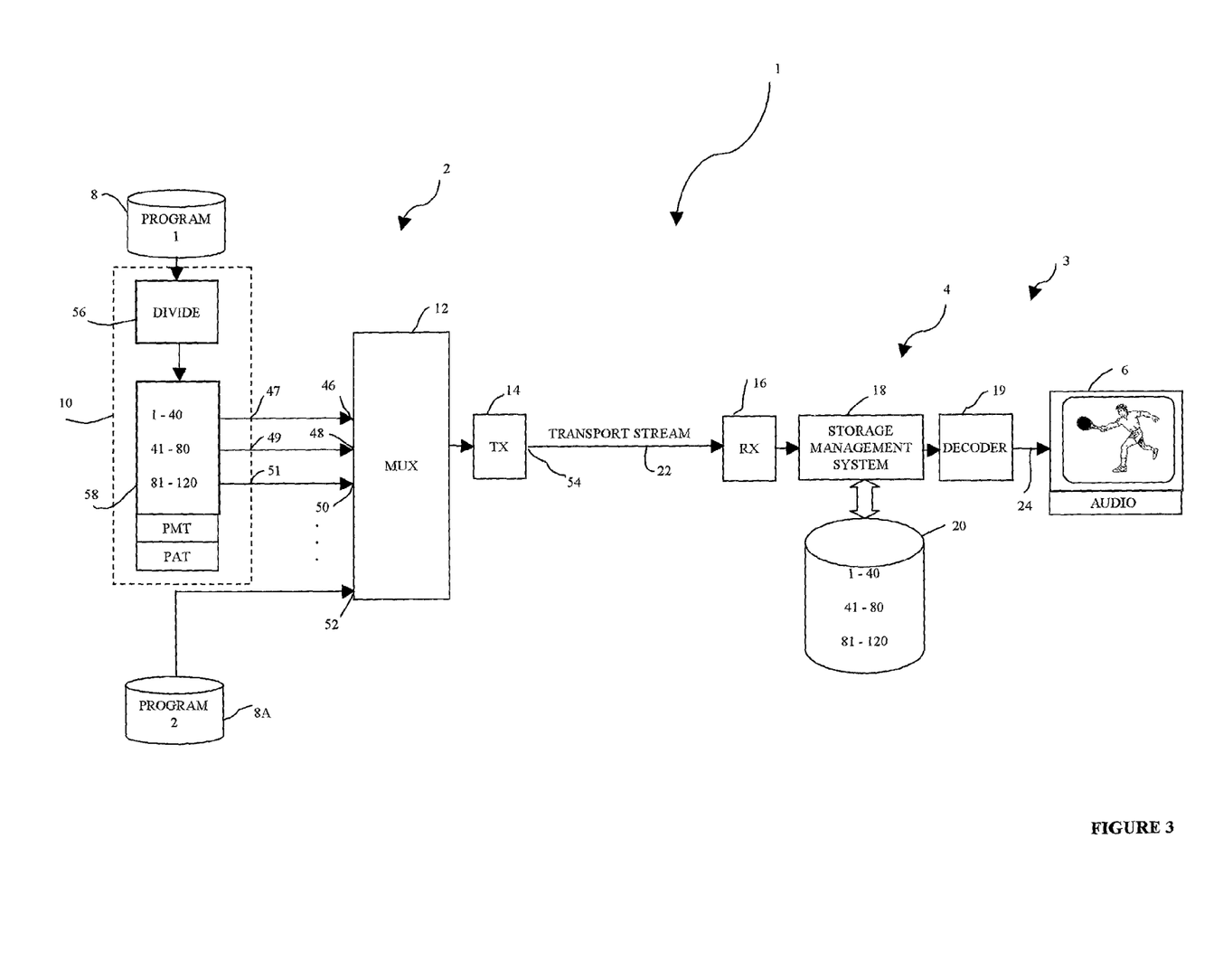
FIG. 3 shows the system of FIG. 1 with an illustration of the generation of a transport stream by dividing a program into three program streams and multiplexing the program streams into the transport stream.

FIG. 3 shows the system 1 of FIG. 1 in greater detail to illustrate the generation of a transport stream in accordance with the present invention. The segmentizer 10 includes a divide module 56 coupled to the source 8. The source 8, for example, retrieves the program (PROGRAM 1) from a first designated storage location within the source 8. It is contemplated that the source 8 may have several storage locations as illustrated by a source 8A for an additional program (PROGRAM 2). In one embodiment, the source 8 provides the program as a MPEG-2 encoded single-program elementary stream. In another embodiment, the source 8 may provide an analog signal, e.g., a NTSC signal. An analog-to-digital converter (not shown) converts the analog signal into a digital signal and an encoder (not shown) generates a MPEG-2 encoded single-program elementary stream.

The module 56 divides the program (i.e., the single-program elementary stream or the packetized elementary stream that represent the program) into a plurality of program streams, wherein each program stream represents a temporal segment of the program. In the above example of a 120-minute program, a first program stream represents minutes 1-40, a second program stream represents minutes 41-80 and a third program stream represents minutes 81-120 of the program. For illustrative purposes, the program streams are shown to be stored at a storage location 58 within the segmentizer 10. However, it is contemplated that the program streams may be stored separately within the source 8.

It is contemplated that the single-program elementary stream may be first divided into the plurality of program streams and then packetized to generate a packetized elementary stream. The packetized elementary stream includes a sequence of transport packets. Each transport packet includes 188 bytes, wherein the first four bytes are reserved for a packet header and wherein the remaining bytes are reserved for payload (e.g., video and audio data.) The packet header includes a field for the packet identification (PID) value. In another embodiment, the single-program elementary stream may be first packetized and then divided into the plurality of program streams.

In the illustrated embodiment, the segmentizer 10 further provides for the ID data that the system 1 uses to properly reconstruct the program at the user location. Further, the segmentizer 10 advantageously provides for the PAT, the PMT and the CAT. The PAT, the PMT and the CAT are available together with the plurality of program streams at the storage location 58.

The segmentizer 10 has outputs 47, 49, 51 for the plurality of program streams of the program. In one embodiment, the segmentizer 10 outputs the plurality of program streams as packetized elementary streams. Each packetized elementary stream includes packets, which are interlaced to from the packetized elementary stream. Those packets that belong to the same program stream have the same PID value, and the packets that belong to different program streams have different PID values. The PID values of the transport packets may be used to demultiplex the sequences of transport packets that belong to different program streams.

An MPEG-2 transport stream includes also several tables. The PAT lists the programs in a transport stream and provides the PID values where the PMT for each program can be found. The packets containing the PAT have a predetermined PID value so that a receiver "knows" how to find the PAT. The PAT may be included in the transport stream at least once every 100 milliseconds. The PMT for each program lists all video streams, audio streams and data streams for a program and provides their PID values. The PID value for each PMT is provided in the PAT. The PMT may be included in the transport stream at least once every 400 milliseconds. If the user subscribes to conditional access services, the ID data further includes the CAT. The program streams output by the segmentizer 10, therefore, comprise the ID data that permits their transmission in a transport stream and their proper reconstruction in the A/V apparatus 4.

The multiplexer 12 has a plurality of inputs 46, 48, 40, 52 to receive a plurality of program streams and to multiplex the plurality of program stream into a transport stream. The multiplexer 12 may be a conventional program multiplexer typically used in system operating in accordance with the MPEG standard.

The transmitter 14 conditions (e.g., modulates) the transport stream for transmission over the network 22. The transport stream has a predetermined constant data rate and has a predetermined bandwidth that limits the number of programs that is simultaneously transmittable. The head end 2 transmits the transport stream at the constant data rate regardless of the number of programs contained within the transport stream. For example, if the transport stream contains six programs or only one program, the head end transmits the transport stream at the same data rate. Therefore, the efficiency of the transport stream drops as the number of programs contained in the transport stream decreases.

In accordance with the present invention, however, the multiplexer 12 receives a plurality of program streams that represent the same program, but different temporal segments. In the illustrated embodiment, the multiplexer 12 receives the three exemplary program streams, which represent the same program, in parallel at the inputs 46, 48, 50. The multiplexer 12 (time) multiplexes these program streams, which include the ID data, and the PAT, the PMT and eventually the CAT into the transport stream. It is contemplated that the multiplexer 12 may multiplex additional program streams representing different programs (e.g., PROGRAM 2) into the transport stream.

The system 1 in accordance with the present invention is configured to determine how much of the transport stream's available bandwidth is used at a given time and to dynamically determine into how many program streams a program may be divided. The number of program streams into which the program increases when more "unused" bandwidth is available. The amount of time required for transmitting this program is therefore reduced, wherein the amount of time decreases with the number of program streams used for transmitting this program. The system 1 in accordance with the present invention therefore uses the bandwidth of the transport stream more efficiently and provides for improved trick play capabilities as described below.

The A/V receiver 4 of the A/V apparatus 3 receives the transport stream and converts (e.g., demodulates) the transport stream back into a format that is compatible with the storage management system 18. The storage management system 18 controls and monitors the decoder 19 and the storage device 20. In one embodiment, the storage management system 18 is configured to store the incoming transport stream on the storage device 20. When the user initiates, for example, watching the program (PROGRAM 1) that is represented by the three program streams, the storage management system 18 retrieves the transport stream from the storage device 20 and forwards the transport stream to the decoder 19. The decoder 19 uses the ID data to identify those program streams that represent the selected program and to identify the proper temporal sequence of the temporal segments. The decoder 19 processes only the program streams of the selected program. The decoder 19 disregards the program stream of any additional program.

In the illustrated embodiment, the time-multiplexed program streams represent the temporal segments (minutes 1-40, 41-80 and 81-120) of the program. The decoder 19 therefore receives and decodes packets of the first temporal segment (minutes 1-40) while the decoder 19 already receives packets of later temporal segments (minutes 41-80, 81-120). Thus, while the decoder 19 decodes the first temporal segment for presentation to the user, the decoder 19 disregards the packets of the later temporal segments.

In order to present the selected program in its entirety to the user, the storage management system 18 plays back the stored transport stream repeatedly to the decoder 19. For example, when the first forty minutes of the selected program are over, the storage management system 18 plays back the transport stream for a second time. During this second playback, the decoder 19 decodes the packets of the second temporal segment (minutes 41-80) for presentation to the user. Likewise, during a third playback, the decoder 19 decodes the packets of the third temporal segment (minutes 81-120). It is contemplated that the number of temporal segment determines the number of playbacks.

Those skilled in the art will appreciate that a current user may select a program, for example, the program (PROGRAM 2) provided by the source 8A, for watching as a "live" program. The storage management system 18 then forwards the incoming transport stream directly to the decoder 19 bypassing the storage device 20. The decoder 19, or an interconnected demultiplexer, extracts the selected program (PROGRAM 2) from the transport stream. In an embodiment that uses a demultiplexer, the demultiplexer performs the reverse operation of the multiplexer 12. That is, the demultiplexer demultiplexes the program streams of the received transport stream. The program streams are then available for further processing that includes storing, reassembling or a combination of storing and reassembling. Further, the decoder 19 reconstructs the selected program in accordance with the decoding procedure defined by the MPEG-2 standard using, among others, the PID values and the tables PAT and PMT.

The current user may also select the program (PROGRAM 1), which is exemplary represented by the three program streams, for watching as a "live" program. The storage management system 18 is thus configured to record the transport stream while the decoder 19 decodes the packets of the first temporal segment (e.g., minutes 1-40). After the first temporal segment is over, the storage management system 18 plays back the stored transport stream so that the decoder 19 can decode the subsequent temporal segments.

The system 1 provides for improved and additional trick play capabilities. For example, the system 1 permits the user to "fast forward" a program and to "skip" a predetermined length of the program. These capabilities exist even when the user selects a "live" program (PROGRAM 1) because the program is transmitted in a reduced amount of time and stored on the storage device 20. That is, parts of the second and third temporal segments are already stored at the A/V receiver 4 while the first temporal segment is still presented to the user.

Further, the system 1 provides for improved transmission efficiency over the network 22. The storage device 20 of the A/V receiver 4 stores the transport stream and thus permits transmitting temporal segments that have a higher sequential order well before these temporal segments are actually presented to the user.

Figure 4:
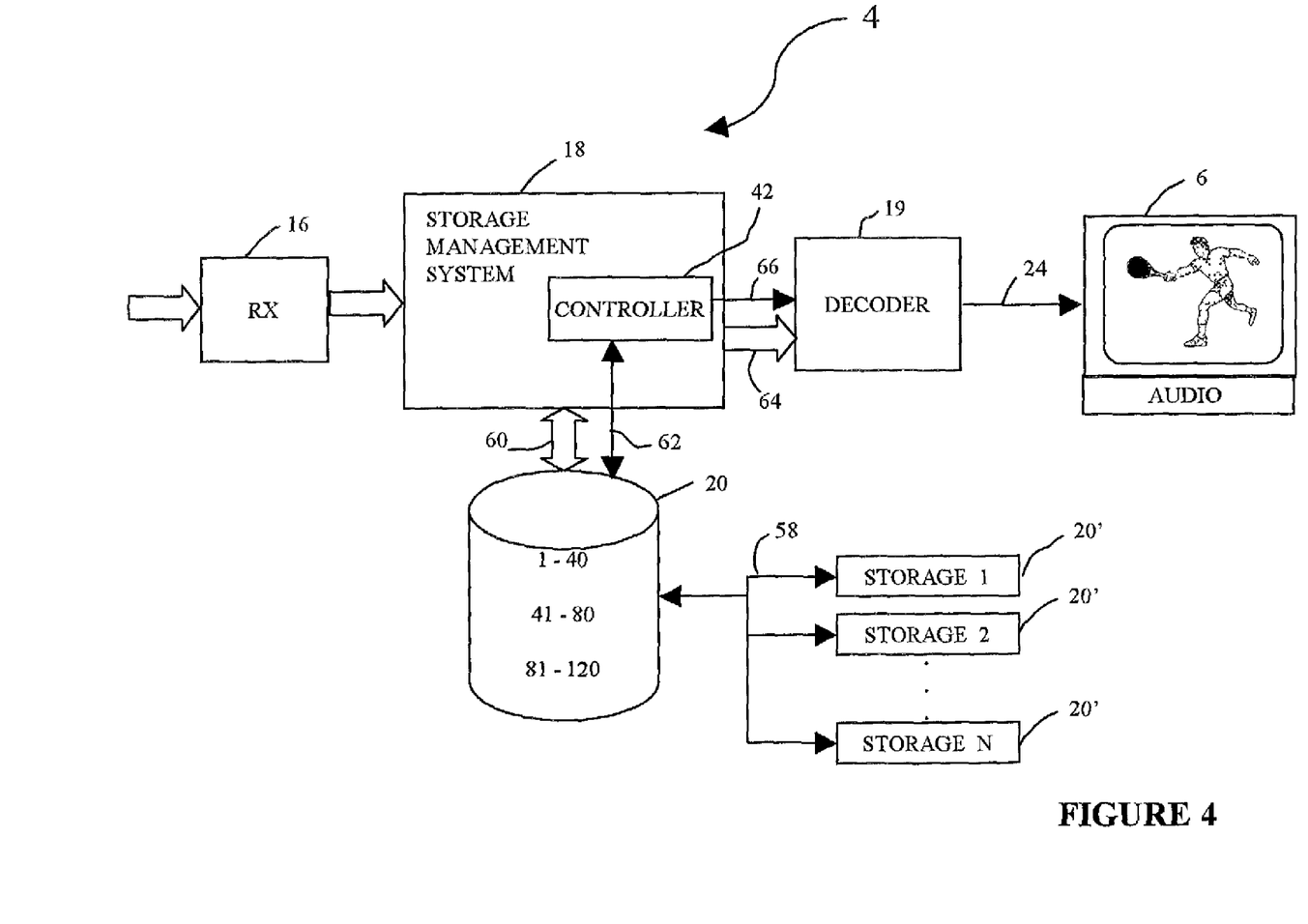
FIG. 4 schematically illustrates an exemplary embodiment of an audio/video receiver apparatus that includes a demultiplexer, a storage device, a decoder and a controller to control the demultiplexer and the storage device.

FIG. 4 shows the A/V receiver 4 coupled to the audio/display device 6 in accordance with one embodiment of the present invention. The storage management system 18 includes a controller 42 coupled to the decoder 19 and the storage device 20. A data connection 60 connects the storage management system 18 and the storage device 20. A control bus 62 connects the controller 42 and the storage device 20. Likewise, a data connection 64 connects the storage management system 18 and the decoder 19, and a control bus 66 connects the controller 42 and the decoder 19.

FIG. 4 illustrates storage locations 20' (STORAGE 1, STORAGE 2, . . . , STORAGE N) that communicate with the storage device 20 via a bus 58. It is contemplated that the storage locations 20' may be addressable storage locations within the storage device 20 and that the storage locations 20' are shown as being coupled to the storage device 20 for illustrative purposes. In an alternative embodiment, the storage locations 20' may be external devices that are coupled to the A/V receiver 4.

In accordance with the present invention, the controller 42 may cause the storage device 20 to store the transport stream in its entirety, to store only the program stream of a selected program, or to store the plurality of program streams for a selected program (e.g., PROGRAM 1). The controller 42 accordingly controls recording and playing back of one or more programs. Further, the controller 42 may be controlled by a central processor of the A/V receiver 4.

It is contemplated that the A/V receiver 4 may be implemented within a set top box, a digital video recorder or a combination of a set top box and a digital video recorder. For illustrative purposes, however, FIGS. 1 and 3 show the A/V receiver 4 coupled between the network 22 and the audio/display device 6. Those skilled in the art will appreciate that in an embodiment with a separate set top box, the set top box is usually coupled to the network 22.

The audio/video device 6 is configured to present multimedia content to the user. The audio/video device 6 may be a TV, a computer monitor or any other display for displaying video and TV programs, text, images, or combinations thereof. Further, the audio/video device 6 may include an audio system for presenting audio programs to the user.

Those skilled in the art will appreciate that, although the drawings show the various elements of the system 1 as individual components, the functionalities of at least some of these elements may be implemented within a single element, such as an ASIC. Further, those skilled in the art will appreciate that at least some functionalities may be implemented in hardware, software, firmware or combinations thereof. For example, the mapping of the program streams may be performed through software.

What is claimed is:

1. A method of transmitting video programs from a source of video programs to a user location in a transport stream having a predetermined bandwidth and a predetermined constant data rate, the method comprising:

dividing a video program into a plurality of program streams to be transmitted on an unused portion of the bandwidth, each program stream representing a temporal segment of the video program, each temporal segment having a predetermined duration which is dynamically allocated depending on the unused portion of the bandwidth;
adding identification data to the plurality of program streams, wherein the identification data is based on a temporal relationship of the plurality of program streams;
multiplexing the plurality of program streams comprising the identification data into the unused portion of the bandwidth of the transport stream; and
transmitting the transport stream to a user location, the video program being transmitted at the data rate in an amount of time which is less than an amount of time for transmitting the video program at the data rate as a single program stream.

2. The method of claim 1, wherein the video program further includes at least one of audio content and data content.

3. The method of claim 1, further comprising multiplexing at least one additional program stream of at least one additional video program into the transport stream.

4. The method of claim 1, further comprising storing the plurality of program streams at the user location and repeatedly playing back the plurality of program streams into a decoder for presenting the video program to the user.

5. The method of claim 4, further comprising individually storing the plurality of program streams.

6. The method of claim 5, further comprising sequentially retrieving the plurality of program streams in accordance with the identification data for presenting the video program to the user.

7. The method of claim 1, further comprising extracting the plurality of program streams from the transport stream at the user location to provide for reassembly of the video program in accordance with the identification data.

8. The method of claim 1, wherein the identification data includes a program association table and a program map table that describe the program streams.

9. The method of claim 8, wherein the identification data further includes a conditional access table that enables a user to subscribe to a conditional access service.

10. The method of claim 1, further comprising compressing the video program prior to dividing the video program into the plurality of program streams.

11. A system for transmitting a video program, comprising:
a segmentizer configured to divide a video program into a plurality of program streams, each program stream representing a temporal segment of the video program, each temporal segment having a predetermined duration which is dynamically allocated depending on an unused bandwidth portion of a transport stream having a predetermined bandwidth and a predetermined constant data rate, said segmentizer further configured to add identification data to the plurality of program streams, wherein the identification data is indicative of a temporal relationship of the plurality of program streams;
a multiplexer configured to multiplex the plurality of program streams comprising the identification data into the unused bandwidth portion of the transport stream; and
a transmitter configured to transmit the transport stream to a user location, the video program being transmitted at the data rate in an amount of time which is less than an amount of time for transmitting the video program at the data rate as a single program stream.

12. The system of claim 11, wherein the video program further includes at least one of audio content and data content.

13. The system of claim 11, wherein the identification data includes a program association table and a program map table that describe the program streams.

14. The method of claim 13, wherein the identification data further includes a conditional access table that enables a user to subscribe to a conditional access service.

15. The system of claim 11, wherein the multiplexer multiplexes at least one additional program stream of at least one additional video program into the transport stream.

16. The system of claim 11, further comprising a storage management system configured to process the transport stream at the user location to provide for reassembly of the video program in accordance with the identification data.

17. The system of claim 16, further comprising a storage device for storing the plurality of program streams, wherein the storage management system controls the storage device.

18. The system of claim 16, wherein the storage management system controls retrieving the plurality of program streams in accordance with the identification data for presenting the video program to the user.

19. The system of claim 16, wherein the storage management system provides for storing of the plurality of program streams and for repeated playing back of the plurality of program streams into a decoder for presenting the video program to the user.

20. A method of reconstructing a video program, comprising:
receiving a transmitted transport stream having a predetermined bandwidth and a predetermined data rate, wherein the transport stream includes a plurality of program streams defining a video program which has been multiplexed into the transport stream so as to reduce an amount of time for transmitting the video program at the data rate from an amount of time for transmitting the video program at the data rate as a single program stream, each program stream representing a temporal segment of the video program, each temporal segment having a predetermined duration which is dynamically allocated depending on an unused portion of the bandwidth, wherein the plurality of program streams includes identification data that is based on a temporal relationship of the plurality of program streams; and
processing the transport stream for reassembly of the video program in accordance with the identification data.

21. The method of claim 20, further comprising storing the plurality of program streams at the user location and repeatedly playing back the plurality of program streams into a decoder for presenting the video program to the user.

22. The method of claim 20, further comprising extracting the plurality of program streams from the transport stream and storing the plurality of program streams.

23. The method of claim 20, wherein the identification data includes a program association table and a program map table that describe the program streams.

24. The method of claim 23, wherein the identification data further includes a conditional access table that enables a user to subscribe to a conditional access service.

25. A system for reconstructing a video program at a user location, comprising:
a receiver configured to receive a transmitted transport stream having a predetermined bandwidth and a predetermined constant data rate, the transport stream including a plurality of multiplexed program streams defining a video program so as to reduce an amount of time for transmitting the video program at the data rate from an amount of time for transmitting the video program at the data rate as a single program stream, wherein each program stream represents a temporal segment of the video program, each temporal segment having a predetermined duration which is dynamically allocated depending on an unused portion of the bandwidth, and wherein the plurality of program streams includes identification data that is indicative of a temporal relationship of the plurality of program streams;

a storage management system coupled to the receiver and configured to process the transport stream to provide for reassembly of the video program in accordance with the identification data;

a storage device coupled to the storage management system, the storage device configured to store at least the plurality of program streams; and a decoder coupled to the storage management system and configured to process the plurality of program streams for presenting the video program to the user.

26. The system of claim 25, wherein the storage management system controls retrieval of the plurality of program streams from the storage device.

27. The system of claim 26, wherein the storage management system is configured to repeatedly play back the plurality of program streams into the decoder for presenting the video program to the user.

28. The system of claim 25, wherein the identification data includes a program association table and a program map table that describe the program streams.

29. The system of claim 28, wherein the identification data further includes a conditional access table that enables a user to subscribe to a conditional access service.

* * * * *